United States Patent
LaBerge

(10) Patent No.: US 8,472,878 B2
(45) Date of Patent: Jun. 25, 2013

(54) SYSTEM AND METHOD TO DETERMINISTICALLY AND DYNAMICALLY PREVENT INTERFERENCE TO THE OPERATION OF SAFETY-OF-LIFE RADIO EQUIPMENT

(75) Inventor: E. F. Charles LaBerge, Towson, MD (US)

(73) Assignee: Honeywell International Inc., Morristown, NJ (US)

( * ) Notice: Subject to any disclaimer, the term of this patent is extended or adjusted under 35 U.S.C. 154(b) by 1230 days.

(21) Appl. No.: 12/146,315

(22) Filed: Jun. 25, 2008

(65) Prior Publication Data
US 2009/0325495 A1 Dec. 31, 2009

(51) Int. Cl.
*H04B 1/04* (2006.01)
*H04B 1/00* (2006.01)
(52) U.S. Cl.
USPC ............... 455/63.1; 455/114.2; 455/278.1; 455/296
(58) Field of Classification Search
USPC ............... 455/63.1, 114.2, 278.1, 296
See application file for complete search history.

(56) References Cited

U.S. PATENT DOCUMENTS

| | | | |
|---|---|---|---|
| 5,572,201 A * | 11/1996 | Graham et al. | 455/45 |
| 6,265,788 B1 * | 7/2001 | Davidson et al. | 307/11 |
| 6,267,723 B1 * | 7/2001 | Matsumura et al. | 600/300 |
| 6,775,545 B2 | 8/2004 | Wright et al. | |
| 7,181,166 B2 * | 2/2007 | Shimada et al. | 455/62 |
| 7,245,216 B2 * | 7/2007 | Burkley et al. | 455/456.1 |
| 2007/0064770 A1 | 3/2007 | Horiguchi | |
| 2009/0058636 A1 * | 3/2009 | Gaskill et al. | 340/539.11 |

FOREIGN PATENT DOCUMENTS

WO 2007043827 4/2007

OTHER PUBLICATIONS

Andren et al., "CCK Modulation Delivers 11 MBbps for High Rate IEEE 802.11 Extension", "Proceedings of the Wireless Symposium. Portable by Design Conference", 1999, pp. 1-10, Publisher: IEEE.
"Specification of the Bluetooth System ", "www.bluetooth.com", 1999, pp. 1-440, vol. 2, Publisher: Bluetooth Consortium.
Chen et al., "A 4-Channel Poly-Phase Filter for Cognitive Radio Systems", "International Symposium on Volume", Apr. 25-27, 2007, pp. 1-4, Publisher: IEEE, Published in: US.
Choi et al., "A Full Duplex Multi-Channel MAC Protocol for Multi-Hop Coginitive Radio Networks", "1st International Conference on Cognitive Radio Oriented Wireless Networks and Communications, 2006", Jun. 2006, pp. 1-5, Publisher: IEEE, Published in: US.

(Continued)

*Primary Examiner* — Wen Huang
(74) *Attorney, Agent, or Firm* — Fogg & Powers LLC

(57) ABSTRACT

A system to deterministically and dynamically prevent interference to the operation of safety-of-life radio equipment in a vehicle is provided. The system includes a radio management system and a wireless network frequency controller communicatively coupled to the radio management system. The wireless network frequency controller is operable to restrict the operational frequency of any one or more of internal wireless communication devices and any one or more of wireless sensors that are communicatively coupled to the wireless network frequency controller. The restriction of the operational frequency is based on input from the radio management system. The restriction of the operational frequency ensures that all the safety-of-life radio equipment has interference-free operation with the internal wireless communication devices and the wireless sensors that are communicatively coupled to the wireless network frequency controller.

20 Claims, 6 Drawing Sheets

OTHER PUBLICATIONS

Hinman, Richard, "Application of Cognitive Radio Technology to Legacy Military Waveforms in a JTRS (Joint Technical Radio System) Radio", "MILCOM 2006", 2006, pp. 23-25, Publisher: Air Force Research Lab, Published in: Rome, NY.

IEEE, "Part 11: Wireless LAN Medium Access Control MAC and Physical Layer PHY Specifications: Higher Speed Physical Layer Exten", "IEEE Std.11b-1999 (R2003)", 1997, pp. 1-96, Publisher: IEEE.

\* cited by examiner

SYSTEM AND METHOD TO DETERMINISTICALLY AND DYNAMICALLY PREVENT INTERFERENCE TO THE OPERATION OF SAFETY-OF-LIFE RADIO EQUIPMENT

BACKGROUND

Wireless technology uses radio frequency signals transmitted and propagated through space to communicate between separated nodes. Wireless technology, including wireless headsets, keyboards, pointing devices, etc., is ubiquitous in the commercial marketplace. Wireless internet access is now available in airports, conference rooms, and coffee shops. In the industrial controls marketplace, wireless sensor networks can be installed, reconfigured and maintained at only a fraction of the cost of more conventional wired networks.

Wireless sensors, wireless control devices, and wireless communication devices are being considered for aeronautical applications on commercial, private, and military aircraft in order to reduce the weight and to reduce the costs for designing, installing, manufacturing, testing, and certifying cable harnesses. Wireless sensors, wireless control devices, and wireless communication devices would also reduce the costs of aircraft interior and of system reconfiguration.

Conventional wireless technology, such as Bluetooth and IEEE 802.11, operates in the unlicensed Industrial, Scientific, and Medical (ISM) bands defined by the Federal Communications Commission (FCC). Members of the Aeronautical Vehicle Systems Institute (AVSI) believe that the Federal Aviation Administration (FAA) will not certify such equipment or specialized equipment operating in these unlicensed bands for use as sensors, controllers, or general communication devices in aircraft infrastructure.

Researchers are developing a wireless sensor network method and signal format that underlies the spectral bands currently dedicated for aeronautical use. Such an underlay approach could have the effect of greatly increasing the spectral efficiency of these dedicated aeronautical bands, as virtually all of the signals using those bands are legacy systems using single channel per carrier methods that are, in today's terms, relatively inefficient. Initial studies toward this end show some promise, however this approach will be subject to extreme scrutiny by the FAA to assure that no harmful interference to existing aeronautical radios is provided.

Cognitive radio is an emerging technology used to detect and avoid interference with current occupants of a given spectral region. With a cognitive radio, the radio itself surveys the available spectrum, characterizes the current use of that spectrum, and makes a decision about where and when to transmit based on an internal data base containing relevant regulatory policies. However, this type of cognitive radio technology has three significant drawbacks related to application to aeronautical wireless sensor networks. Firstly, cognitive radio access to spectrum is, by its very nature, statistical. The FAA has already indicated its dislike of statistical systems for safety critical applications. Therefore, cognitive access faces a high level of scrutiny and is likely to be denied. Secondly, cognitive radio requires access to some kind of master database or policy engine. While a centralized data base could be engineered and actually used via the wireless sensor network access itself, ensuring policy compliance throughout the distributed wireless sensor network on the aircraft is complex. This complexity is an additional barrier to certification approval by the FAA. Additionally, the spectral sensing capability increases the complexity of the wireless nodes. The success of wireless sensor networks rests on achieving the weight, maintenance, and reconfiguration advantages foreseen for the technology so that the nodes are very simple and very low cost. Even with the application of Moore's Law, cognitive nodes will always be more complicated than non-cognitive nodes.

SUMMARY

The present application relates to a system to deterministically and dynamically prevent interference to the operation of safety-of-life radio equipment in a vehicle. The system, in one embodiment, includes a radio management system and a wireless network frequency controller communicatively coupled to the radio management system. The wireless network frequency controller is operable to restrict the operational frequency of any one or more of internal wireless communication devices and any one or more of wireless sensors that are communicatively coupled to the wireless network frequency controller. The restriction of the operational frequency is based on input from the radio management system. The restriction of the operational frequency ensures that all the safety-of-life radio equipment has interference-free operation with the internal wireless communication devices and the wireless sensors that are communicatively coupled to the wireless network frequency controller.

DRAWINGS

In accordance with common practice, the various described features are not drawn to scale but are drawn to emphasize features relevant to the present invention. Like reference characters denote like elements throughout figures and text.

DETAILED DESCRIPTION

In the following detailed description, reference is made to the accompanying drawings that form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the present invention. The following detailed description is, therefore, not to be taken in a limiting sense.

It is desirable to provide a wireless sensor network that does not require the use of complex cognitive radios and that does not interfere with the safety critical equipment, referred to herein as "safety-of-life radio equipment."

The description in this document complies with the Aeronautical Vehicle Systems Institute (AVSI) usage by referring to such a network as a wireless sensor network, although it must be understood that the concept and method disclosed here is equally applicable to wireless devices used for control and/or general communications applications as well.

Figure 1:
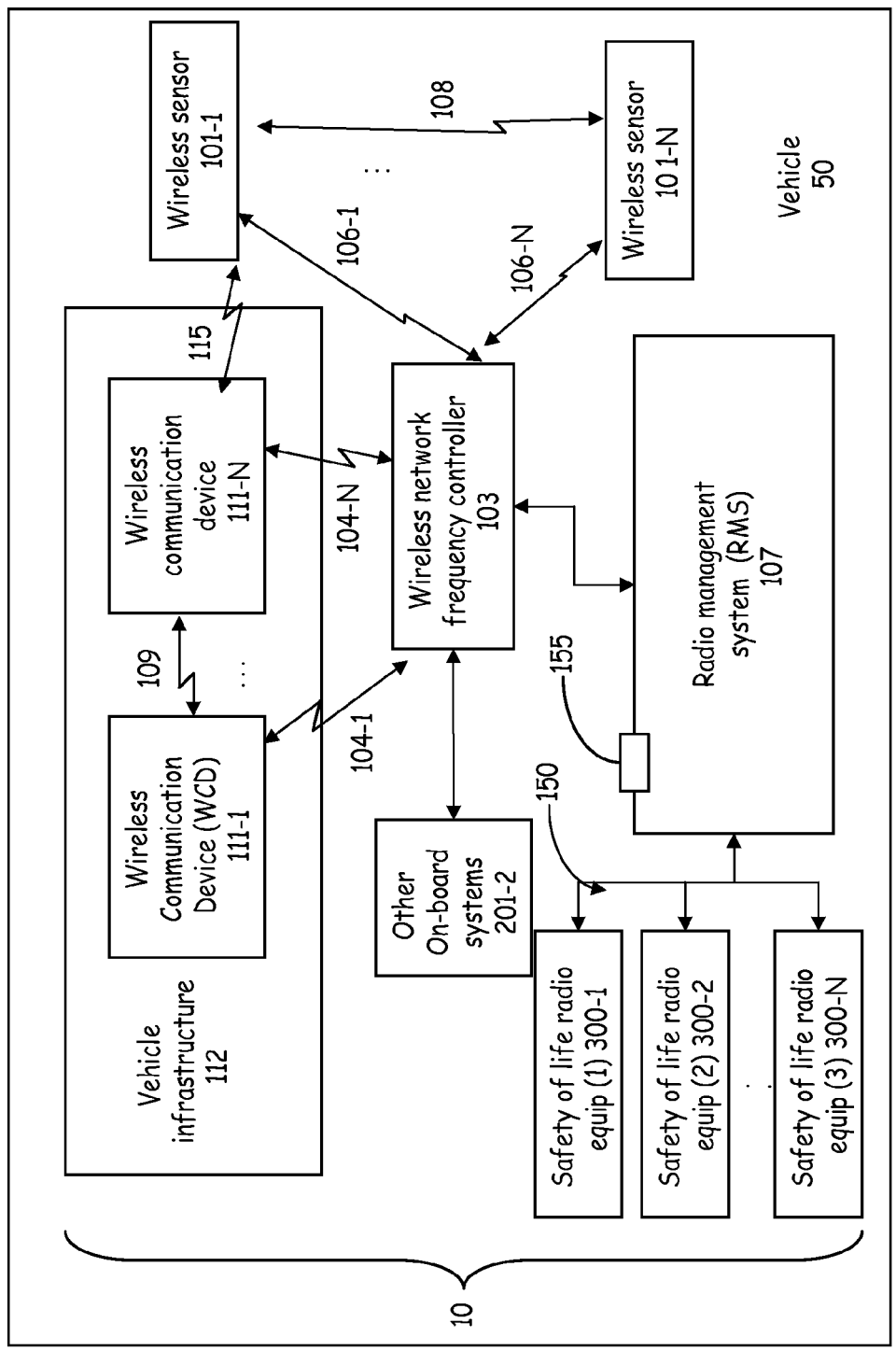
FIG. 1 is a system in accordance with one embodiment to deterministically and dynamically prevent interference to the operation of safety-of-life radio equipment in a vehicle.

FIG. 1 shows a system 10 in accordance with one embodiment to deterministically and dynamically prevent interference to the operation of safety-of-life radio equipment 300 (1-N) in a vehicle 50. The system 10 includes a radio management system 107 and a wireless network frequency controller 103 that is communicatively coupled to the radio management system 107. The system 10 also includes a plurality of operational safety-of-life radio equipment 300(1-N) and at least one wireless sensor 101(1-N) and/or at least one internal wireless communication device 111(1-N). The wireless sensors 101(1-N) and wireless communication devices 111(1-N) are referred to herein as "wireless sensor nodes." Each safety-of-life radio equipment 300(1-N) operates at a fixed and known frequency at any given time during the flight. This fixed frequency may be subject to change under pilot command.

The wireless sensors 101(1-N) represent a plurality of wireless sensors. The internal wireless communication devices 111(1-N) represent a plurality of internal wireless communication devices. The internal wireless communication devices 111(1-N) are operated as part of a vehicle infrastructure 112 of the vehicle 50. In one implementation of this embodiment, system 10 includes at least one wireless controller (other than wireless network frequency controller 103) that is controlled by the wireless network frequency controller 103.

The radio management system 107 includes user input 155. The user input 155 is an interface to the radio management system 107 through which the user indicates when one of the safety-of-life radio equipment 300(1-N) is activated and/or deactivated in the vehicle 50. The user input 155 can be a display, a control panel, an activation switch, a push button, a graphical user interface (GUI) or some other user interface. The safety-of-life radio equipment 300(1-N) is communicatively coupled to the radio management system 107 via dedicated communication/control links represented generally by numeral 150.

The wireless network frequency controller 103 is operable to restrict the operational frequency of any one or more of internal wireless communication devices 111(1-N) and any one or more of wireless sensors 101(1-N) that are communicatively coupled to the wireless network frequency controller 103. The wireless network frequency controller 103 restricts the operational frequency the internal wireless communication devices 111(1-N) and the wireless sensors 101(1-N) by controlling the frequencies used by the internal wireless communication devices 111(1-N) and the wireless sensors 101(1-N). The wireless network frequency controller 103 prevents the internal wireless communication devices 111(1-N) and the wireless sensors 101(1-N) from using frequencies that would cause interference with the safety-of-life radio equipment 300(1-N). In this manner, each of the safety-of-life radio equipment 300(1-N) has interference-free operation even when the safety-of-life radio equipment 300(1-N) is operable within communication range of the internal wireless communication devices 111(1-N) and the wireless sensors 101(1-N) that are communicatively coupled to the wireless network frequency controller 103. Conversely, the internal wireless communication devices 111(1-N) and the wireless sensors 101(1-N) that are communicatively coupled to the wireless network frequency controller 107 experience interference-free operation with the safety-of-life radio equipment 300(1-N) in the vehicle 50. The operational frequency of the wireless sensors 101(1-N) and/or the internal wireless communication devices 111(1-N) can change as the operational safety-of-life radio equipment 300(1-N) changes.

The internal wireless communication devices 111(1-N) are communicatively coupled to the wireless network frequency controller 103 via a wireless communication link 104(1-N), respectively. The wireless sensors 101(1-N) are communicatively coupled to the wireless network frequency controller 103 via a wireless communication link 106(1-N), respectively.

In one embodiment, two or more of the wireless communication devices 111(1-N) are communicatively coupled to each other via a wireless communication link represented generally at 109. In another embodiment, one or more of the wireless communication devices 111(1-N) are communicatively coupled to one or more of the wireless sensors 101(1-N) via a wireless communication link represented generally at 115. In still another embodiment, two or more of the wireless sensors 101(1-N) are communicatively coupled to each other via a wireless communication link represented generally at 108.

In some embodiments, on-board systems 201-2 are housed in the vehicle 50 and are communicatively coupled to the wireless network frequency controller 103. In one implementation of this embodiment, the vehicle 50 is an aircraft. In another implementation of this embodiment, the vehicle 50 is an emergency vehicle, such as a fire truck, a police vehicle, or an ambulance, that house safety-of-life radio equipment and wireless sensor nodes or other wireless devices.

Figure 2:
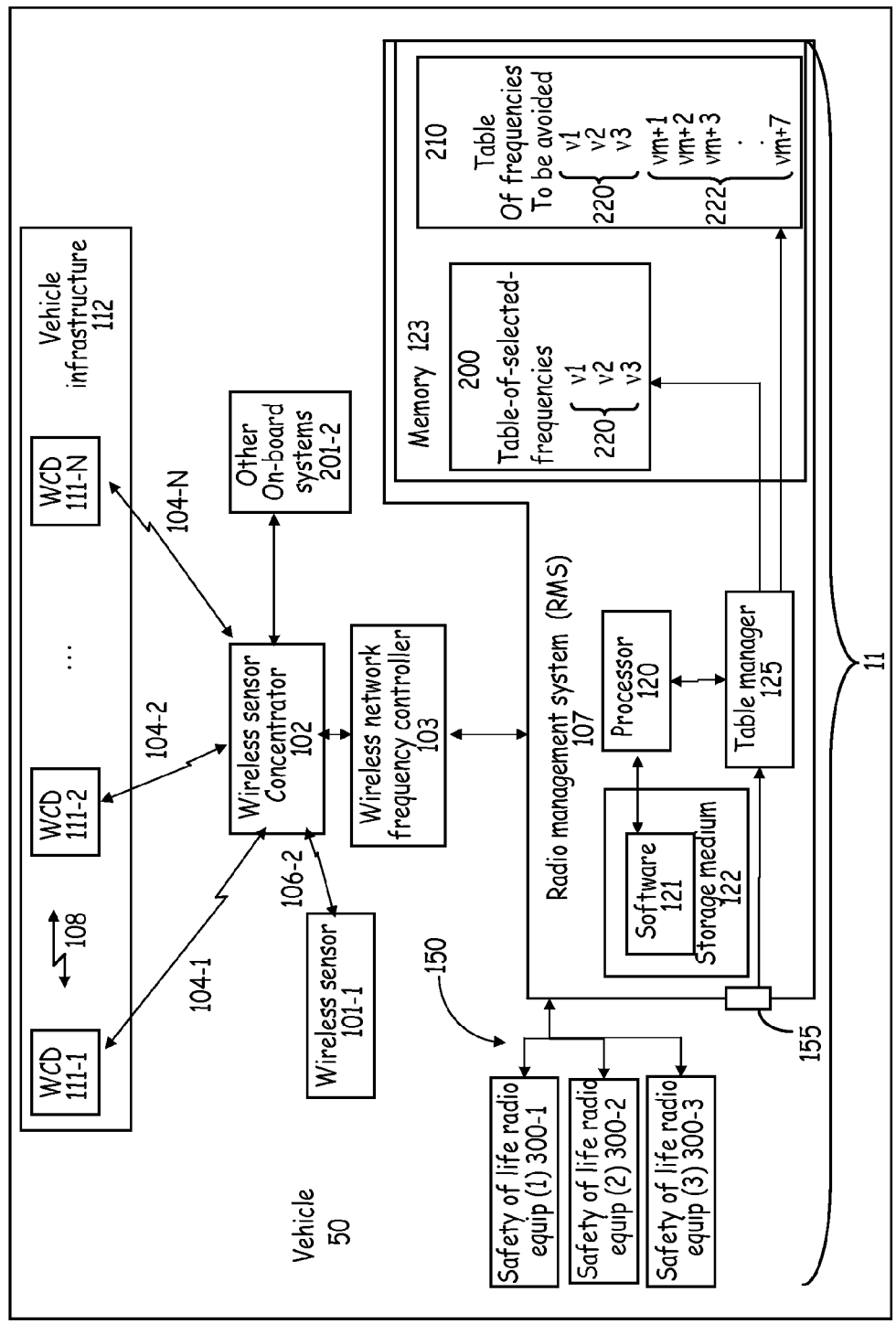
FIG. 2 is a system in accordance with one embodiment to deterministically and dynamically prevent interference to the operation of safety-of-life radio equipment in which a first three of safety-of-life radio equipment are operable.
Figure 3:
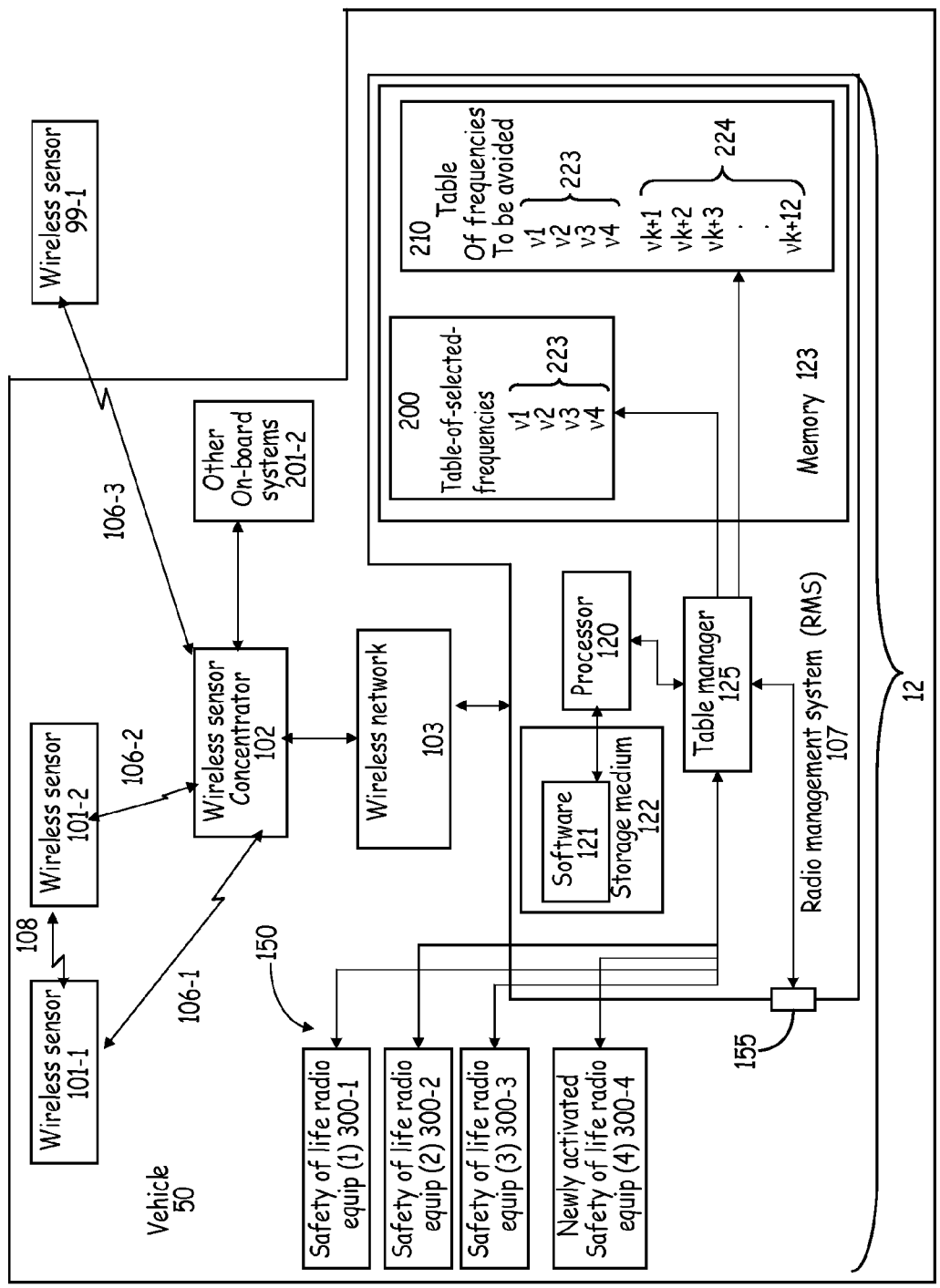
FIG. 3 is a system in accordance with one embodiment to deterministically and dynamically prevent interference to the operation of safety-of-life radio equipment in which a first four of safety-of-life radio equipment are operable.
Figure 4:
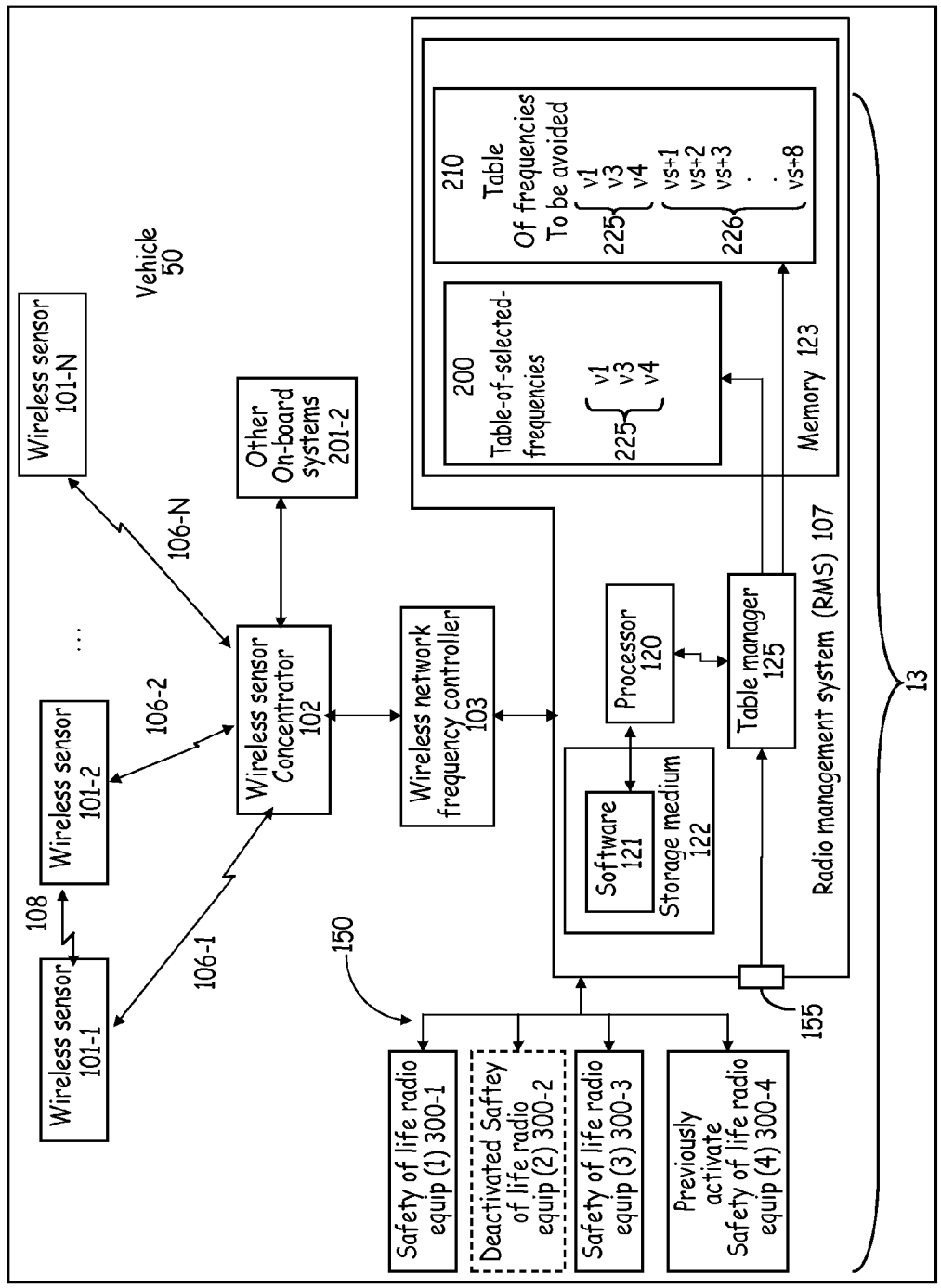
FIG. 4 is a system in accordance with one embodiment to deterministically and dynamically prevent interference to the operation of safety-of-life radio equipment in which a second three of safety-of-life radio equipment are operable.

FIGS. 2-4 show systems 11-13, respectively, in accordance with embodiment of the present invention to deterministically and dynamically prevent interference to the operation of safety-of-life radio equipment 300(1-N) (FIG. 1) in which the operational status of the various safety-of-life radio equipment 300(1-N) changes.

FIG. 2 is a system 11 in accordance with one embodiment to deterministically and dynamically prevent interference to the operation of safety-of-life radio equipment in which a first three of safety-of-life radio equipment 300(1-3) are operable. System 11 includes the radio management system 107 and the wireless network frequency controller 103 that is communicatively coupled to the radio management system 107. System 11 also includes the operational safety-of-life radio equipment 300(1-3), a wireless sensor 101-1, and a plurality of internal wireless communication devices 111(1-N). A concentrator 102 is communicatively coupled to the wireless network frequency controller 103 to aggregate and relay the sensor or communication traffic to the designated wireless communication device 111(1-N) and/or wireless sensor 101-1. In one implementation of this embodiment, the wireless network controller 103 and concentrator 102 are combined in common hardware.

The radio management system 107 includes a table manager 125 and a processor 120. The table manager 125 manages a table-of-selected-frequencies 200 and a table-of-frequencies-to-be-avoided 210. The processor 120 is communicatively coupled with the table manager 125 and the wireless network frequency controller 103. The radio management system 107 further comprises the user input 155 that is communicatively coupled to the table manager 125. System 11 includes dedicated communication links 150 to communicatively couple the safety-of-life radio equipment 300 (1-3) to the table manager 125 in the radio management system 107. The table manager 125 accepts information indicative of operational frequencies of safety-of-life radio equipment currently in operation from the dedicated communication links 150 and/or the user input 155 at the table-of-selected-frequencies 200 and the table-of-frequencies-to-be-avoided 210. The table-of-selected-frequencies 200 and the table-of-frequencies-to-be-avoided 210 are stored in memory 123. The table manager 125 receives updated information indicative of operational frequencies of safety-of-life radio equipment currently in operation as the safety-of-life radio equipment 300(1-3) is activated and/or deactivated in the vehicle 50. As updated information is received, the table-of-selected-frequencies 200 and the table-of-frequencies-to-be-avoided 210 are modified to reflect the changes in operational frequencies of the safety-of-life radio equipment currently in operation.

In one implementation of this embodiment, the user input 155 is not included in system 11 and the table manager 125 accepts input from the least one dedicated communication link 150 when a safety-of-life radio equipment 300(1-3) is activated and/or deactivated in the vehicle 50.

The table-of-selected-frequencies 200 is a list of the operational frequencies 220 of the safety-of-life radio equipment 300(1-3) currently in operation in the vehicle 50. The table-of-frequencies-to-be-avoided 210 is a list of operational frequencies 220 of the safety-of-life radio equipment 300(1-3) currently in operation as well as electromagnetic interference/electro-magnetic compatibility (EMI/EMC) threat frequencies 222 generated from the list of operational frequencies 220.

The table manager 125 sends the information indicative of operational frequencies 220 of the operational safety-of-life radio equipment 300(1-3) to the processor 120. The processor 120 calculates the EMI/EMC threat frequencies 222 based on the operational frequencies 220 of the safety-of-life radio equipment 300(1-3) currently in operation. The EMI/EMC threat frequencies 222 are harmonics, inter-modulation frequencies, and/or sidebands of the operational frequencies 220 of the safety-of-life radio equipment 300(1-3).

The processor 120 sends information indicative of the calculated EMI/EMC threat frequencies 222 to the table manager 125. The table manager 125 accepts the calculated EMI/EMC threat frequencies 222 at the table-of-frequencies-to-be-avoided 210. The processor 120 also sends the information indicative of the calculated EMI/EMC threat frequencies 222 and information indicative of the operational frequencies 220 of the operational safety-of-life radio equipment 300(1-3) to the wireless network frequency controller 103. The wireless network frequency controller 103 ensures that all wireless sensor nodes communicatively coupled to the wireless network frequency controller 103 do not operate at any of EMI/EMC threat frequencies 222 or at any of operational frequencies 220 of the operational safety-of-life radio equipment 300(1-3).

As the operation safety-of-life radio equipment 300(1-3) changes, the operational frequencies 220 change and the calculated EMI/EMC threat frequencies 222 change. The table manager 125 updates the table-of-frequencies-to-be-avoided 210 as the operational frequencies 220 and the calculated EMI/EMC threat frequencies 222 change. The wireless network frequency controller 103 dynamically controls the operational frequency of the wireless sensor 101-1 and each wireless communication device 111(1-3) so that they operate at frequencies other than the operational frequencies 220 and calculated EMI/EMC threat frequencies 222.

FIGS. 2-4 show how the frequencies listed in the table-of-selected-frequencies 200 and the table-of-frequencies-to-be-avoided 210 change as the operational safety-of-life radio equipment changes. In order to indicate the dynamic nature of the safety-of-life radio equipment and the wireless sensor nodes (i.e., the wireless communication devices and/or the wireless sensors) in the vehicle 50, the systems 11-13 in FIGS. 2-4, respectively, differ in which safety-of-life radio equipment and nodes are operational in the vehicle 50.

The operational frequencies 220, 223, 225 in FIGS. 2, 3, and 4, respectively, are lists of operational frequencies of the currently operational safety-of-life radio equipment 300(1-3). The list of operational frequencies 220, 223, 225 are stored in memory 123 in the table-of-selected-frequencies 200. The list of EMI/EMC threat frequencies 222, 224, and 226 in FIGS. 2, 3, and 4, respectively, are generated based on the operational frequencies 220, 223, 225, respectively. The list of EMI/EMC threat frequencies 222, 224, and 226 are calculated by the processor 120. The list of operational frequencies 220, 223, 225 and the list of EMI/EMC threat frequencies 222, 224, and 226, respectively, are stored in memory 123 in the table-of-frequencies-to-be-avoided 210.

The processor 120 executes software 121 and/or firmware that causes the processor 120 to perform at least some of the processing described here as being performed by the radio management system 107. The software 121 and/or firmware executed by the processor 120 comprises a plurality of program instructions that are stored or otherwise embodied on a storage medium 122 from which at least a portion of such program instructions are read for execution by the processor 120. In one implementation, the processor 120 comprises processor support chips and/or system support chips such as application-specific integrated circuits (ASICs).

Memory 123 comprises any suitable memory now known or later developed such as, for example, random access memory (RAM), read only memory (ROM), and/or registers within the processor 120. In one implementation, the processor 120 comprises a microprocessor or microcontroller. Moreover, although the processor 120 and memory 123 are shown as separate elements in FIGS. 2-4, in one implementation, the processor 120 and memory 123 are implemented in a single device (for example, a single integrated-circuit device).

In the embodiment shown in FIG. 2, the safety-of-life radio equipment 300(1-3) is operational, one wireless sensor 101-1 is communicatively coupled to the wireless network frequency controller 103 via the wireless sensor concentrator 102, and a plurality of wireless communication devices 111 (1-N) are communicatively coupled to the wireless network frequency controller 103 via the wireless sensor concentrator 102. The operational frequencies 220 in the table-of-selected-frequencies 200 include $v_1$, $v_2$, and $v_3$ since the safety-of-life radio equipment 300(1-3) are operational. The EMI/EMC threat frequencies 222 in the table-of-frequencies-to-be-avoided 210 include $v_{m+1}$, $v_{m+2} \ldots v_{m+7}$. When the system 11 is configured as shown in FIG. 2, the wireless network frequency controller 103 controls the operational frequencies of the wireless sensor 101-1 and the plurality of wireless communication devices 111(1-N) so that the wireless sensor nodes operate at the frequencies other than the frequencies $v_1$, $v_2$, $v_3$, $v_{m+1}$, $v_{m+2} \ldots$ and $v_{m+7}$ listed in table-of-frequencies-to-be-avoided 210.

FIG. 3 is a system 12 in accordance with one embodiment to deterministically and dynamically prevent interference to the operation of safety-of-life radio equipment in which a first four of safety-of-life radio equipment 300(1-4) are operable. FIG. 3 shows an embodiment of a system 12 in which the operational wireless sensor nodes and the operational safety-of-life radio equipment differs from the system 11 (FIG. 2). In the embodiment shown in FIG. 3, the safety-of-life radio equipment 300(1-4) is operational, two wireless sensors 101 (1-2) in the vehicle 50 are communicatively coupled to the wireless network frequency controller 103 via the wireless sensor concentrator 102, and one wireless sensor 99-1 external to the vehicle 50 is communicatively coupled to the wireless network frequency controller 103 via the wireless sensor concentrator 102. The wireless sensor 99-1 can be a radio of a person working outside of the vehicle 50. For example, if the vehicle 50 is an aircraft being loaded at an airport terminal, the radios of the people working outside of the aircraft (for example, to refuel the aircraft or load baggage) will not interfere with the operational safety-of-life radio equipment inside the aircraft.

As shown in FIG. 3 for system 12, the operational frequencies 223 in the table-of-selected-frequencies 200 include the frequencies $v_1$, $v_2$, $v_3$, and $v_4$ since the safety-of-life radio equipment 300(1-4) are operational. The list of EMI/EMC threat frequencies 224 in the table-of-frequencies-to-be-avoided 210 includes the frequencies $v_{k+1}$, $v_{k+2}$ ... $v_{k+12}$. When the system 12 is configured as shown in FIG. 3, the wireless network frequency controller 103 prevents the two wireless sensors 101(1-2) and the wireless sensor 99-1 from operating at the frequencies $v_1$, $v_2$, $v_3$, $v_4$, $v_{k+1}$, $v_{k+2}$ ... and $v_{k+12}$ listed in table-of-frequencies-to-be-avoided 210.

When the safety-of-life radio equipment 300-4 is activated, the table manager 125 accepts the operational frequency $v_4$ of the newly activated safety-of-life radio equipment 300-4 at the table-of-selected-frequencies 200 and the table-of-frequencies-to-be-avoided 210. Thus, the table-of-selected-frequencies 200 and the table-of-frequencies-to-be-avoided 210 are modified so the operational frequencies 223 include frequencies $v_1$, $v_2$, $v_3$, and $v_4$. The table manager 125 sends the updated frequencies 223 to the processor 120. The processor 120 uses the updated operational frequencies 223 to re-calculate the list of EMI/EMC threat frequencies 224 to generate the updated list of EMI/EMC threat frequencies 224, which includes frequencies $v_{k+1}$, $v_{k+2}$ ... $v_{k+12}$. The table manager 125 accepts the updated list of EMI/EMC threat frequencies 224 and replaces the old list of EMI/EMC threat frequencies 222 with the newly calculated list of EMI/EMC threat frequencies 224 at the table-of-frequencies-to-be-avoided 210.

FIG. 4 is a system 13 in accordance with one embodiment to deterministically and dynamically prevent interference to the operation of safety-of-life radio equipment in which a second three of safety-of-life radio equipment 300(1) and 300(3-4) are operable.

FIG. 4 shows an embodiment of a system 13 in which the operational wireless sensor nodes and the operational safety-of-life radio equipment differs from system 11 (FIG. 2) and from system 12 (FIG. 3). In the embodiment shown in FIG. 4, safety-of-life radio equipment 300(1) and 300(3-4) is operational and a plurality of wireless sensors 101(1-N) in the vehicle 50 are communicatively coupled to the wireless network frequency controller 103 via the wireless sensor concentrator 102. As shown in FIG. 4 for system 13, the operational frequencies 225 in the table-of-selected-frequencies 200 include the frequencies $v_1$, $v_3$, and $v_4$ since the safety-of-life radio equipment 300-1 and 300(3-4) are operational and the safety-of-life radio equipment 300-2 is deactivated. The EMI/EMC threat frequencies 226 in the table-of-frequencies-to-be-avoided 210 include the frequencies $v_{s+1}$, $v_{s+2}$ ... $v_{s+8}$. When the system 13 is configured as shown in FIG. 4, the wireless network frequency controller 103 prevents the plurality of wireless sensors 101(1-N) from operating at the frequencies $v_1$, $v_3$, $v_4$, $v_{s+1}$, $v_{s+2}$ ... and $v_{s+8}$ listed in table-of-frequencies-to-be-avoided 210.

When the safety-of-life radio equipment 300-2 is deactivated, the table manager 125 recognizes the deactivation of the safety-of-life radio equipment 300-2 and removes the operational frequency $v_2$ of the safety-of-life radio equipment 300-2 from the table-of-selected-frequencies 200 and the table-of-frequencies-to-be-avoided 210. Thus, the table-of-selected-frequencies 200 and the table-of-frequencies-to-be-avoided 210 are modified so the operational frequencies 225 only include frequencies $v_1$, $v_3$, and $v_4$. The table manager 125 sends the updated frequencies 225 to the processor 120. Based on the operational frequencies 225, the processor 120 re-calculates the EMI/EMC threat frequencies 226, which now include the frequencies $v_{s+1}$, $v_{s+2}$ ... $v_{s+8}$. The table manager 125 accepts the revised list of threat frequencies and replaces the old list of EMI/EMC threat frequencies 224 with the newly calculated list of EMI/EMC threat frequencies 224 at the table-of-frequencies-to-be-avoided 210.

Figure 5:
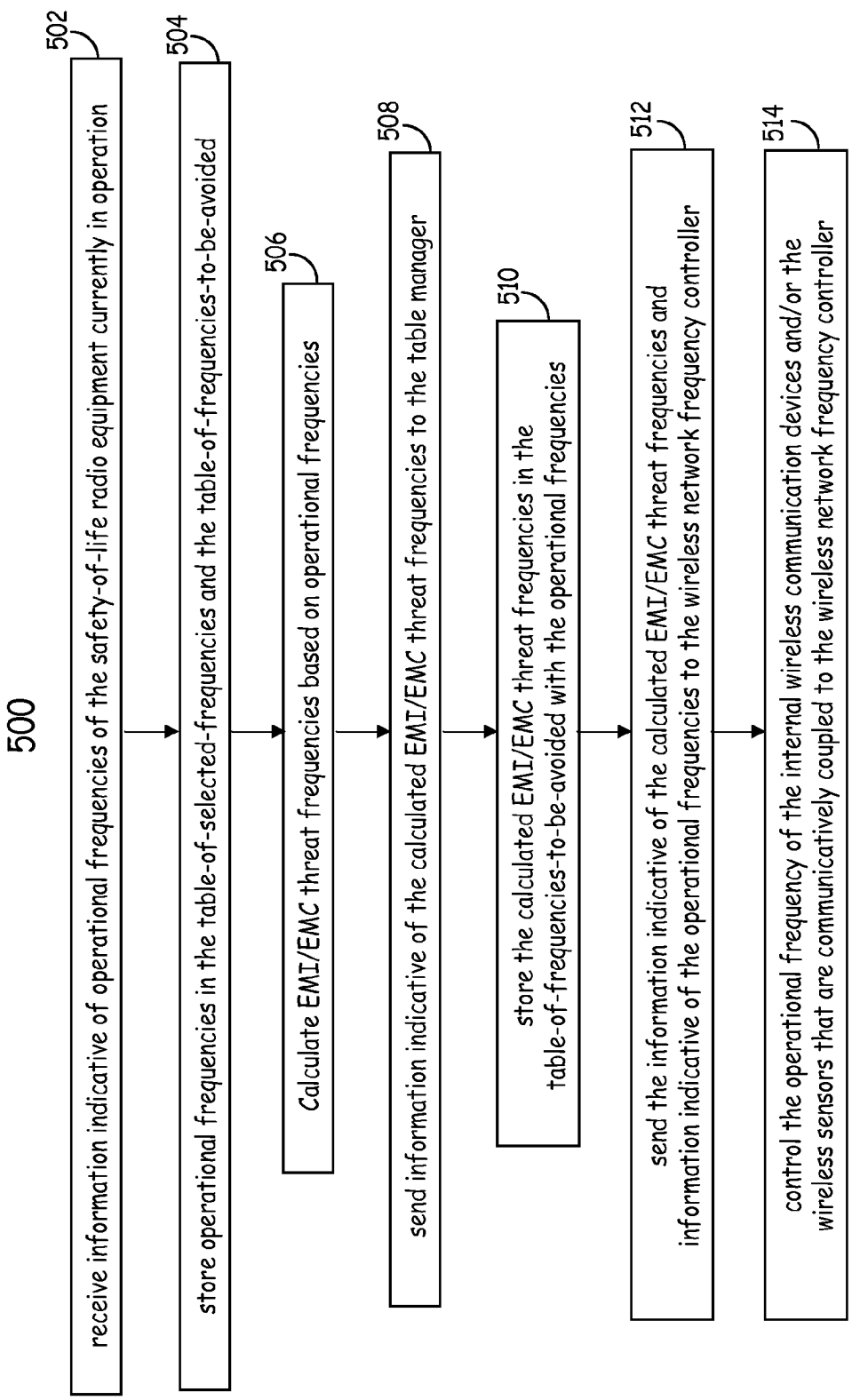
FIG. 5 is a flow diagram of one embodiment of a method to deterministically and dynamically prevent interference to the operation of safety-of-life radio equipment in a vehicle in accordance with the present invention.

FIG. 5 is a flow diagram of one embodiment of a method to deterministically and dynamically prevent interference to the operation of safety-of-life radio equipment in a vehicle in accordance with the present invention. The method 500 is implemented with machine readable medium and instructions stored thereon as described above with reference to FIG. 2. The method 500 is described with reference to the embodiment shown in FIG. 2, though the method 500 is applicable to other configurations of safety-of-life radio equipment and wireless sensor nodes, which are communicatively coupled to the radio management system 107 (FIG. 1).

At block 502, information indicative of operational frequencies of the safety-of-life radio equipment currently in operation is received at a table manager in a radio management system. In one implementation of this embodiment, information indicative of operational frequencies of the safety-of-life radio equipment 300(1-3) (FIG. 2) currently in operation is received at the table manager 125 in the radio management system 107.

At block 504, the operational frequencies of the safety-of-life radio equipment currently in operation are stored in the table-of-selected-frequencies 200 and in the table-of-frequencies-to-be-avoided. In one implementation of this embodiment, the operational frequencies $v_1$, $v_2$, and $v_3$ of the safety-of-life radio equipment 300(1-3) (FIG. 2) currently in operation in the vehicle 50 are stored in the table-of-selected-frequencies 200 and in the table-of-frequencies-to-be-avoided 210 as the list of frequencies 220.

At block 506, EMI/EMC threat frequencies are calculated based on operational frequencies of the safety-of-life radio equipment currently in operation. In one implementation of this embodiment, EMI/EMC threat frequencies $v_{m+1}$, $v_{m+2}$ ... and $v_{m+7}$ are calculated by the processor 120. The calculations are based on operational frequencies $v_1$, $v_2$, and $v_3$ of the safety-of-life radio equipment 300(1-3) currently in operation.

At block 508, information indicative of the calculated EMI/EMC threat frequencies is sent to the table manager. In one implementation of this embodiment, information indicative of the calculated EMI/EMC threat frequencies $v_{m+1}$, $v_{m+2}$ ... and $v_{m+7}$ is sent to the table manager 125 in the radio management system 107 from the processor 120.

At block 510, the calculated EMI/EMC threat frequencies are stored in the table-of-frequencies-to-be-avoided. In one implementation of this embodiment, the calculated EMI/EMC threat frequencies $v_{m+1}$, $v_{m+2}$ ... and $v_{m+7}$ are stored in the table-of-frequencies-to-be-avoided 210 as the list 222.

At block 512, the information indicative of the calculated EMI/EMC threat frequencies and information indicative of the operational frequencies of the safety-of-life radio equipment currently in operation is sent to the wireless network frequency controller from the processor. In one implementation of this embodiment, the information indicative of the calculated EMI/EMC threat frequencies $v_{m+1}$, $v_{m+2}$ ... and $v_{m+7}$ and information indicative of the operational frequencies $v_1$, $v_2$, and $v_3$ of the safety-of-life radio equipment 300 (1-3) currently in operation is sent to the wireless network frequency controller 103 from the processor 120.

At block 514, the operational frequencies of any one or more of the internal wireless communication devices and/or wireless sensors that are communicatively coupled to the wireless network frequency controller are controlled to prevent interference between operational safety-of-life radio equipment and the internal wireless communication devices and to prevent interference between operational safety-of-life radio equipment and the wireless sensors. In one implementation of this embodiment, the operational frequency of the internal wireless communication devices 111(1-N) and wireless sensor 101-1 that are communicatively coupled to the wireless network frequency controller 103 are controlled to prevent interference between operational safety-of-life radio equipment 300(1-3) and the internal wireless communication devices 111(1-N) and wireless sensor 101-1 (FIG. 2). The wireless network frequency controller 103 does not allow any of the internal wireless communication devices 111(1-N) and wireless sensor 101-1 to operate at any of the calculated EMI/EMC threat frequencies $v_{m+1}$, $v_{m+2}$ ... and $v_{m+7}$ or at the operational frequencies $v_1$, $v_2$, and $v_3$ of the safety-of-life radio equipment 300(1-3).

Figure 6:
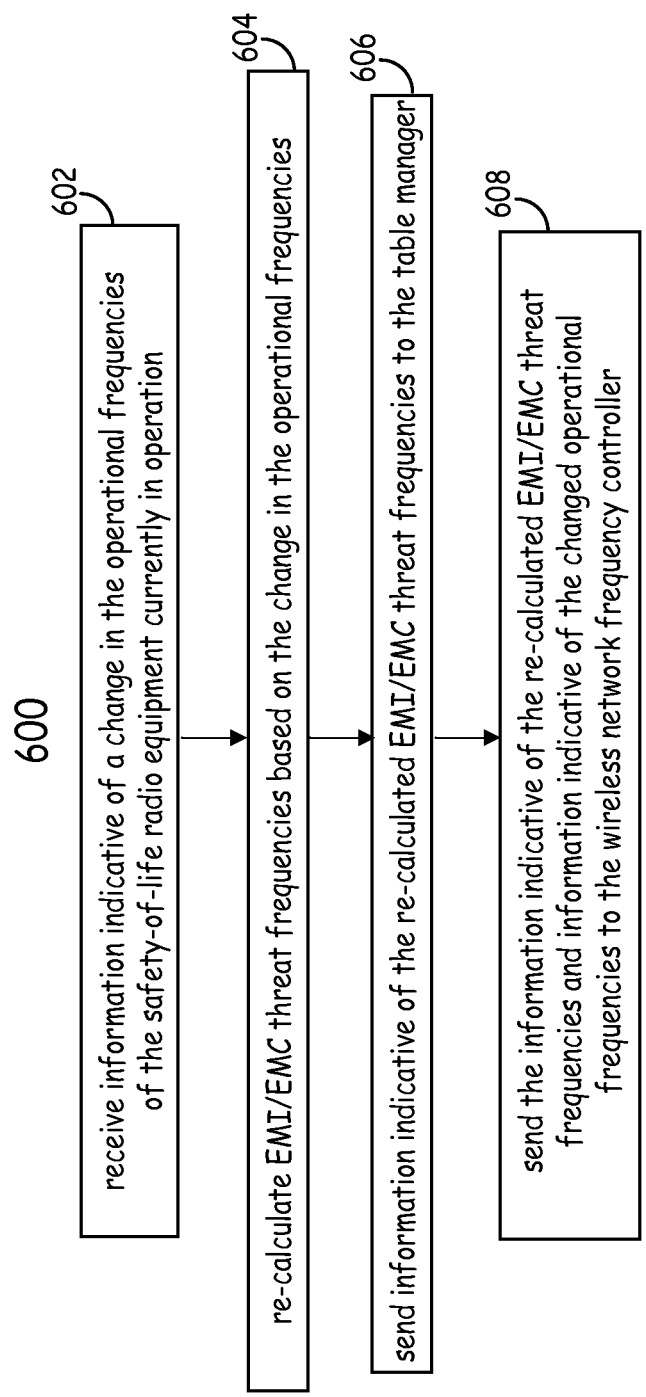
FIG. 6 is a flow diagram of one embodiment of a method to update the table-of-selected-frequencies and the table-of-frequencies-to-be-avoided when the safety-of-life radio equipment in operation changes in accordance with the present invention.

FIG. 6 is a flow diagram of one embodiment of a method 600 to update the table-of-selected-frequencies 200 and the table-of-frequencies-to-be-avoided when the safety-of-life radio equipment in operation changes in accordance with the present invention. Method 600 is described with reference to FIGS. 2 and 3 although the method 600 is applicable to other configurations of safety-of-life radio equipment and wireless sensor nodes. Method 600 is implemented with machine readable medium and instructions stored thereon as described above with reference to FIG. 2.

At block 602, information indicative of a change in the operational frequencies of the safety-of-life radio equipment currently in operation is received at the table manager. The table manager accepts changed operational frequencies of the safety-of-life radio equipment currently in operation at the table-of-selected-frequencies and at the table-of-frequencies-to-be-avoided based on the receiving information indicative of a change in the operational frequencies of the safety-of-life radio equipment currently in operation. In one implementation of this embodiment, the table manager 125 receives the indication that the safety-of-life radio equipment 300-4 has been activated in the vehicle 50 (FIG. 3). In this case, the table manager 125 accepts changed operational frequency $v_4$ of at the table-of-selected-frequencies 200 and at the table-of-frequencies-to-be-avoided 210. The table-of-selected-frequencies 200 and table-of-frequencies-to-be-avoided 210 now each include the list 223.

At block 604, the processor re-calculates the EMI/EMC threat frequencies based on the change in the operational frequencies of the safety-of-life radio equipment currently in operation. In one implementation of this embodiment, the processor 120 re-calculates the EMI/EMC threat frequencies based on the addition of the frequency $v_4$ of at the table-of-selected-frequencies 200. The recalculated EMI/EMC threat frequencies include the frequencies $v_{k+1}$, $v_{k+2}$ ... $v_{k+12}$.

At block 606, the processor sends information indicative of the re-calculated EMI/EMC threat frequencies to the table manager. The re-calculated EMI/EMC threat frequencies are stored in the table-of-frequencies-to-be-avoided based on the sending information indicative of the re-calculated EMI/EMC threat frequencies to the table manager. In one implementation of this embodiment, the processor 120 sends information indicative of the re-calculated EMI/EMC threat frequencies $v_{k+1}$, $v_{k+2}$ ... $v_{k+12}$ to the table manager 125. In this case, the re-calculated EMI/EMC threat frequencies $v_{k+1}$, $v_{k+2}$ ... $v_{k+12}$ are stored in the table-of-frequencies-to-be-avoided 210 as the list of EMI/EMC threat frequencies 224.

At block 608, the processor sends the information indicative of the re-calculated EMI/EMC threat frequencies and information indicative of the changed operational frequencies of the safety-of-life radio equipment currently in operation to the wireless network frequency controller. In one implementation of this embodiment, the processor 120 sends the information indicative of the re-calculated EMI/EMC threat frequencies $v_{k+1}$, $v_{k+2}$ ... $v_{k+12}$ and information indicative of the changed operational frequencies $v_1$, $v_2$, $v_3$, and $v_4$ of the safety-of-life radio equipment 300(1-4) of currently in operation to the wireless network frequency controller 103. The operational frequency of the wireless sensor 101(1-2) and wireless sensor 99-1, which are now communicatively coupled to the wireless network frequency controller 103 (FIG. 3), are controlled to prevent interference between operational safety-of-life radio equipment 300(1-4) and the wireless sensor 101(1-2) and wireless sensor 99-1. The wireless network frequency controller 103 does not allow the wireless sensor 101(1-2) and wireless sensor 99-1 to operate at any of the calculated EMI/EMC threat frequencies $v_{k+1}$, $v_{k+2}$ ... $v_{k+1,2}$ or at the operational frequencies $v_1$, $v_2$, $v_3$, and $v_4$ of the safety-of-life radio equipment 300(1-4).

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A system to deterministically and dynamically prevent interference to the operation of safety-of-life radio equipment in a vehicle, the system comprising:
 a radio management system in the vehicle; and
 a wireless network frequency controller in the vehicle, the wireless network frequency controller communicatively coupled to the radio management system, wherein the wireless network frequency controller is operable to restrict the operational frequency of any one or more of internal wireless communication devices in the vehicle and any one or more of wireless sensors, in the vehicle, that are communicatively coupled to the wireless network frequency controller based on input from the radio management system, so that all the safety-of-life radio equipment is not being interfered with by the internal wireless communication devices and the wireless sensors that are communicatively coupled to the wireless network frequency controller.

2. The system of claim 1, wherein the radio management system comprises:
- a table manager to manage a table-of-selected-frequencies and a table-of-frequencies-to-be-avoided; and
- a processor communicatively coupled with the table manager and the wireless network frequency controller.

3. The system of claim 2, wherein the radio management system further comprises a user input communicatively coupled to the table manager.

4. The system of claim 3, wherein the user input is communicatively coupled to the safety-of-life radio equipment via at least one dedicated communication link.

5. The system of claim 2, further comprising at least one dedicated communication link to communicatively couple the safety-of-life radio equipment to the radio management system.

6. The system of claim 2, wherein the table-of-selected-frequencies comprises a list of operational frequencies of the safety-of-life radio equipment currently in operation in the vehicle and the table-of-frequencies-to-be-avoided comprises the list of frequencies of the safety-of-life radio equipment currently in operation and a list of the electro-magnetic interference/electro-magnetic compatibility (EMI/EMC) threat frequencies generated from the list of operational frequencies of the safety-of-life radio equipment currently in operation in the vehicle.

7. The system of claim 6, wherein at least one of the any one or more of wireless sensors communicatively coupled to the wireless network frequency controller are positioned external to the vehicle.

8. The system of claim 1, wherein the any one or more of internal wireless communication devices and the any one or more of wireless sensors communicatively coupled to the wireless network frequency controller has interference-free operation with the safety-of-life radio equipment in the vehicle.

9. A radio management system in a vehicle to control operational frequencies of internal wireless communication devices in the vehicle and to control operational frequencies of wireless sensors in the vehicle in order to deterministically and dynamically prevent interference with safety-of-life radio equipment in the vehicle, the system comprising:
- a table manager in the radio management system in the vehicle to manage a table-of-selected-frequencies and a table-of-frequencies-to-be-avoided; and
- a processor in the radio management system communicatively coupled with the table manager and a wireless network frequency controller in the vehicle, wherein the table manager is communicatively coupled to at least one safety-of-life radio equipment in the vehicle via a dedicated communication link.

10. The radio management system of claim 9, further comprising a user input communicatively coupled to the table manager.

11. The radio management system of claim 10, further comprising a memory storing the table-of-selected-frequencies and the table-of-frequencies-to-be-avoided.

12. The radio management system of claim 10, wherein the processor executes software stored in a storage medium to calculate electro-magnetic interference/electro-magnetic compatibility (EMI/EMC) threat frequencies based on the operational frequencies in the table-of-selected-frequencies.

13. A method to deterministically and dynamically prevent interference to the operation of safety-of-life radio equipment communicatively coupled to a wireless network frequency controller, the method comprising:
calculating EMI/EMC threat frequencies at a radio management system in a vehicle based on operational frequencies of the safety-of-life radio equipment currently in operation in the vehicle;
sending information indicative of the calculated EMI/EMC threat frequencies to a table manager in the radio management system; and
sending the information indicative of the calculated EMI/EMC threat frequencies and information indicative of the operational frequencies of the safety-of-life radio equipment currently in operation in the vehicle to the wireless network frequency controller in the vehicle.

14. The method of claim 13, further comprising:
controlling the operational frequency of any one or more of the internal wireless communication devices communicatively coupled to the wireless network frequency controller to prevent interference between operational safety-of-life radio equipment and the internal wireless communication devices.

15. The method of claim 14, further comprising:
controlling the operational frequency of any one or more of the wireless sensors communicatively coupled to the wireless network frequency controller to prevent interference between the operational safety-of-life radio equipment and the internal wireless communication devices and to prevent interference between the operational safety-of-life radio equipment and the wireless sensors.

16. The method of claim 13, further comprising:
controlling the operational frequency of any one or more of the wireless sensors communicatively coupled to the wireless network frequency controller to prevent interference between the operational safety-of-life radio equipment and the wireless sensors.

17. The method of claim 13, further comprising:
storing the operational frequencies of the safety-of-life radio equipment currently in operation in the table-of-selected-frequencies and in the table-of-frequencies-to-be-avoided; and
storing the calculated EMI/EMC threat frequencies in the table-of-frequencies-to-be-avoided.

18. The method of claim 13, further comprising:
receiving information indicative of operational frequencies of the safety-of-life radio equipment currently in operation.

19. The method of claim 18, further comprising:
receiving information indicative of a change in the operational frequencies of the safety-of-life radio equipment currently in operation;
re-calculating EMI/EMC threat frequencies based on the change in the operational frequencies of the safety-of-life radio equipment currently in operation;
sending information indicative of the re-calculated EMI/EMC threat frequencies to the table manager; and
sending the information indicative of the re-calculated EMI/EMC threat frequencies and information indicative of the changed operational frequencies of the safety-of-life radio equipment currently in operation to the wireless network frequency controller.

20. The method of claim 19, further comprising:
storing the changed operational frequencies of the safety-of-life radio equipment currently in operation in the table-of-selected-frequencies and in the table-of-frequencies-to-be-avoided based on the receiving information indicative of a change in the operational frequencies of the safety-of-life radio equipment currently in operation; and storing the re-calculated EMI/EMC threat frequencies in the table-of-frequencies-to-be-avoided based on the sending information indicative of the re-calculated EMI/EMC threat frequencies to the table manager.

* * * * *